Nov. 1, 1960    J. A. McNALLY    2,958,317
ANTI-DETONANT SYSTEM FOR INTERNAL COMBUSTION ENGINES
Filed March 4, 1958    2 Sheets-Sheet 2

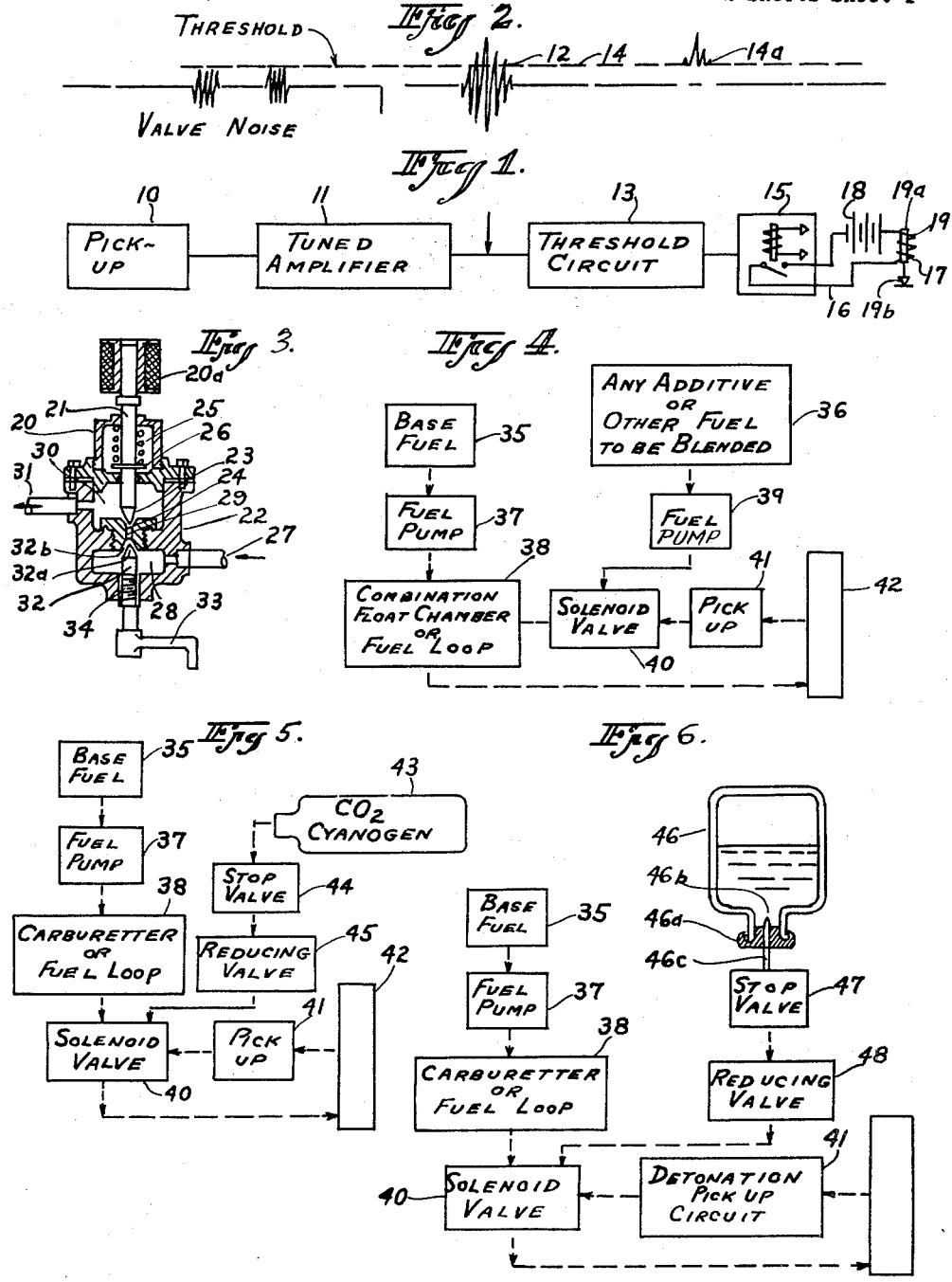

INVENTOR
JAMES A. McNALLY
BY
Campbell Pilcher
ATTORNEY

United States Patent Office

2,958,317
Patented Nov. 1, 1960

2,958,317

ANTI-DETONANT SYSTEM FOR INTERNAL COMBUSTION ENGINES

James A. McNally, 18 Elizabeth Road, Upper Montclair, N.J., assignor of one-half to Campbell Pilcher, Upper Montclair, N.J.

Filed Mar. 4, 1958, Ser. No. 719,045

1 Claim. (Cl. 123—119)

This invention relates to improvements in methods and apparatus for controlling combustion conditions of internal combustion engines, and more particularly to methods and apparatus for suppressing engine knock or detonation in such engines by the blending of anti-knock additive substances with a base fuel in ratios which vary as a function of the intensity of the engine knock.

Engine knocking or detonation has long been a problem in internal combustion engines, it having been found considerably troublesome in spark ignition engines, it being well known that such engine knocking can have serious consequences in certain types of engines, particularly of the aircraft variety. Furthermore, such engine knocking can be troublesome to a high degree in engines of the diesel variety. The nearly instantaneous and premature explosion (i.e. "detonation" referred to herein) of a mixture of fuel and air in an internal combustion engine with the resulting high pressure fluctuations and engine knock is related to or associated with self-ignition of the compressed unburned fuel-air charge in the cylinder ahead of the normal combustion flame front. A large portion of the energy liberated in this premature explosion is wasted, for example, in heating the cylinder wall, thus reducing the mechanical energy available and unnecessarily increasing the heat load of the cooling system. Furthermore, the pistons and valves of the system are subject to substantial damage as a result of the very high temperatures which are created in the cylinders during the periods of knocking.

Furthermore, serious conditions of autoignition may result from such detonation or engine knocking if the latter is not checked and this will preclude proper control of combustion or gas ignition by the spark plug.

In addition to the above disadvantages, engine knocking further limits the permissible degree of compression in an engine. Also, engine knocking increases with the increase in compression pressures for which the engine is designed.

Since the maximum motor torque and the engine fuel economy increase with increased compression, if it is necessary to reduce engine compression in order to check detonation or knocking, it is all but impossible to improve the power output and the fuel economy of the engine.

Many of the commercially available gasolines today have a relatively low octane rating and thus in modern high compression automobile or aircraft engines the problem of knocking may become especially troublesome and thus may increase the tendency to knock by virtue of such relatively low octane rating.

Knocking in a specific engine is a function of the design of the engine itself, for example, the compression ratio, the shape of the head with relation to the position of the valves and spark plugs. The design of the spark plug itself also is a factor. Knocking also is a function of the adjustments of the engine, for example, spark advance, the richness of the air-fuel mixture, and the load under which the engine is operating at the time. Further, knocking is a function of the fuel used, the higher the octane rating of the fuel, providing it is adequate for the particular engine, the less tendency there exists to knock. However, the use of a fuel with a rating higher than necessary for the design or particular conformation of the engine, its adjustments and load, is wasteful. An additional condition that affects the tendency of an engine to knock is the ambient weather condition under which the engine is operating. This refers principally to ambient moisture conditions. An engine on a dry day will, under certain conditions, knock while under the same conditions on a rainy or wet day will not knock.

In accordance with one form of my invention comprising a method, and with respect to reciprocating type engines employing fuel wherein the performance thereof is subject to limitations and disadvantages by virtue of detonations, to the base fuel is added or blended and additive substance having anti-knock properties in amounts needed to suppress the aforementioned detonation or knock and as demanded or called for by an apparatus or device which measures or reflects directly the knock conditions in the engine at the time. Furthermore, the anti-knock additive is added or blended into the base fuel only in those precise amounts necessary to counteract an existing knock and no more, thus achieving heretofore unattained economy in fuel cost while eliminating engine knock or detonation or reducing same to a negligible or imperceptible amount. The economy results from the fact that the cost of the anti-knock additive is very high, e.g., usually considerably higher than the cost of a base fuel which may, for example, be a gasoline of low octane rating.

My invention, in a further aspect thereof, comprises apparatus for achieving the above objectives and includes in combination: an engine; a tank for the base fuel; a container for the anti-knock additive; a base fuel pump for moving the base fuel from its tank to a blending space or region located at the carburetor, or in the engine manifold (or in the case of a fuel injection type engine) in the fuel loop or just ahead of the nozzle at each individual engine cylinder; an additive pump for moving the anti-knock additive from its container to a metering or measuring device which may, for example, comprise an adjustable stroke reciprocating pump; and a knock or detonation measuring device which is responsive to knock conditions at the time within the engine. Furthermore, an additional element is employed for relating the severity of the knock conditions in the engine to the amount of anti-knock additive which is blended into the base fuel, and the aforementioned blend of base fuel and anti-knock additive is directed to the engine by suitable means thereby immediately suppressing the detonation.

My invention, by use of the knock measuring device, employs directly the most reliable criteria in determining the amount of anti-knock additive which is required. Furthermore, closely associated and integrating into the engine the blending means has distinct economic advantages over blending a fuel with an anti-knock additive at any other place or time.

One of the main objects of the present invention, therefore, is to provide an effective method for eliminating or reducing to insignificance detonation or knocking in internal combustion engines under circumstances attaining economy heretofore not possible.

A further object is to provide a novel method and apparatus for eliminating or so reducing engine knocking which employ criteria for determining the amount of the anti-knock additive required which criteria is of extreme precision and not heretofore employed.

A further object is to reduce to a negligible degree or eliminate engine knocking by the introduction of controlled amounts of an anti-knock additive as demanded by a knock measuring device operatively connected directly to the engine.

The above and further objects and novel features will more fully appear from the description set forth below when read in connection with the accompanying drawings, it being understood, of course, that such drawings are for purposes of illustration only and do not constitute limitations upon the scope of the invention, reference being had for the latter purpose to the appended claim.

In the drawings:

Fig. 1 is a schematic block diagram showing one form of apparatus embodying the invention;

Fig. 2 is a graphical schematic showing of certain electrical conditions relative to the apparatus of Fig. 1;

Figure 7:
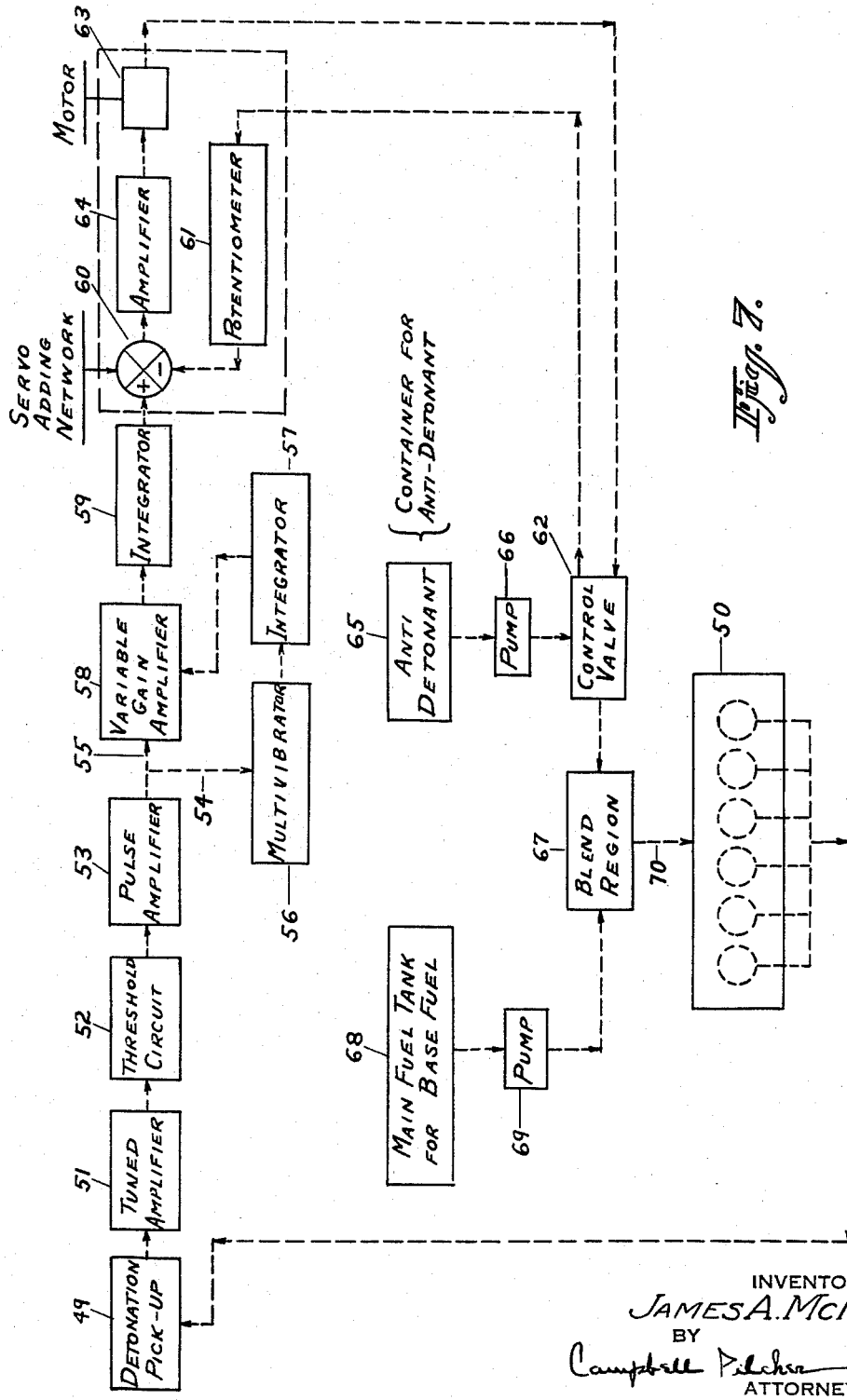

Fig. 3 comprises a vertical sectional view, partly in section and with parts broken away, of a solenoid valve which can be advantageously employed in the present invention;

Fig. 4 is a schematic block diagram of apparatus embodying another form of the invention and showing means for adding or blending any useful additive to a base fuel in the engine in response to the intensity of knocking or detonation;

Fig. 5 is a further schematic illustration of a modification of apparatus embodying the present invention showing means for blending carbon dioxide and tetraethyl lead and introducing same into an engine for the purpose of suppressing detonation;

Fig. 6 is another schematic showing of apparatus embodying a further modification of the present invention; and Fig. 7 is a schematic illustration showing another form of the invention.

In solving the problems set forth above with respect to the suppressing entirely or reducing to a negligible degree detonation or knocking, it should be borne in mind that fuels, such as gasoline fuels, have been vastly improved in recent years to increase the octane rating and performance numbers thereof. Fuel is sold in a number of different grades for this purpose. For a specific type of engine it is desirable to buy the cheapest type of fuel which will satisfy it and still provide adequate performance. Since engines usually are required to operate at peak performance only a small part of the time, to use at all times a fuel which will prevent knocking at such peak performance incurs a heavy penalty.

In the past many attempts have been made to reduce or eliminate engine knocking and the literature on this subject is replete with devices which adjust certain engine settings to prevent knock. For example, such prior devices advance or retard the spark or change the fuel-air ratio in response to load. Also, such prior devices have been actuated by means which are responsive to centrifugal force depending on engine r.p.m. or they have been actuated in response to the degree of vacuum in the fuel intake manifold for adjusting certain engine control factors.

Such prior art also shows the use of anti-detonant additives, such as: water; water and alcohol; or carbon dioxide. These are either continuously added in a uniform flow or added in amounts responsive to forces in an intake manifold.

The prior art also discloses many means for measuring knock, most of which employ well known magnetostrictive effect. Some knock measuring devices comprise "knock pickups" which are inserted directly into the combustion chamber and measure a voltage generated in proportion to the rate of change of pressure in the cylinder. This voltage is amplified to a high level and may be read upon a meter. Other types of devices of this variety can be attached to the outside of the cylinder to measure electronically the acoustical effect of such detonation. Such devices electronically remove that component of the noise which is caused by normal operation of the engine and amplify the remaining portion which is caused by a knock or detonation.

Such apparatus of the prior art have been employed only for measuring knock or detonation in connection with the rating of fuels.

However, nowhere has there been employed a detonation pickup to measure directly the contemporaneous demand for anti-knock additive for the particular engine. The amount of knock thus indicates the need and in the present invention controls the amount of anti-knock substance added to the fuel to prevent or reduce the knock.

Thus in accordance with one form of my invention a detonation pickup device is employed to measure directly the amount of knock. The extent of such knock is accurately determined and indicates the demand for the anti-knock substance. Such device controls the introduction into the engine fuel system of a selected amount of anti-knock substance which is a function of such demand.

Referring to the drawings in greater detail with particular reference to Fig. 1, a knock measuring device comprising a knock pickup 10 is employed which is of the magnetostrictive type and which feeds signals to an amplifier 11 which is tuned to eliminate the low frequency combustion wave from the pickup signal thereby to provide the output signal 12 of Fig. 2.

A threshold amplifier 13 is constructed and arranged to pass only those voltages which exceed a certain minimum value above a selected threshold voltage 14 (Fig. 2). This can be determined for any engine by using a detonation pickup meter. Provision is made in the circuit for determining this value 14. The threshold voltage 14 is selected to be just greater than the largest voltage attained by the valve noise as shown by the dotted line. The voltage output of the threshold amplifier 13 thus comprises only the contribution voltage 14a due to the detonation wavelet, if present, since all other voltages are below this level. If a contribution voltage 14a due to detonation is present it operates a relay 15 which on closing energizes a suitable circuit 16 of an electric solenoid valve 17, such circuit having a power source 18. Such solenoid valve 17 includes a solenoid 19, the opposite extremities of which are connected to the relay 15, the battery or power source 18 being connected in a conventional way.

The solenoid 19 is provided with a core 19a which controls a valve 19b, the latter controlling the flow of an anti-knock additive as aforementioned.

A suggested form of the valve 20 for controlling the additive is shown in Fig. 3 and comprises a solenoid 20a which controls the movement of a solenoid core 21 with respect to a valve housing 22, the core 21 having a pointed valve surface 23 which coacts with a complementary valve surface 24. A spring 25 connected to core 21 is provided for normally holding the valve in a closed condition. A suitable adjustment nut 26 is provided for controlling the tension of spring 25. An inlet at 27 is provided which feeds fluid into a primary chamber 28 and thence through a conduit 29 which is controlled by the valve surfaces 23, 24 and thence into a secondary chamber 30 which is in communication with an outlet 31.

A suitable needle valve 32 is provided having an adjustable handle 33 which threadedly is associated at 34 with the valve device. By controlling the size of the opening between valve surfaces 32a and 32b, the rate of flow of the additive is controlled. Valve 32 can be hand set at a constant setting or adjusted continuously in response to extent of knock whenever knocking occurs. Such adjusting can be effected, for example, by a servo loop circuit responsive to extent of knock.

Referring now to Fig. 4, there are illustrated by schematic diagram means for introducing any useful additive in the engine in response to knock demand as measured by a knock meter or knock response device. A tank 35 is provided for a base fuel which is to have added to it from time to time in response to knock demand an additive or anti-detonant from a container 36. A fuel pump 37 moves the fuel from the tank 35 to the float chamber of a carburetor 38. The anti-knock additive from the container 36 is directed into the carburetor 38 via a pump 39 and a solenoid valve 40, the latter being under the influence of the knock pickup device 41. The solenoid valve thus feeds the anti-knock additive into the carburetor on demand, that is, on knock demand, the resultant mixture being directed from the carburetor 38 to an engine 42 thereby to eliminate or suppress the detonation.

When the pickup device 41 detects the presence of a knock it operates the solenoid valve 40 and causes the additive from the container 36 to be introduced into the fuel system as long as there is such a knock.

Alternatively, in a fuel injection type system, the element 38 comprises a blending region ahead of the fuel injection nozzle.

Referring now to Fig. 5, there will now be described a modification wherein carbon dioxide ($CO_2$) is added as an anti-detonant to the fuel system of an engine. The modification shown in Fig. 5 is identical to that shown in Fig. 4, like reference numerals being applied to like elements, the distinction being found in the employment of a $CO_2$ cylinder 43 which is in communication with the solenoid valve 40 via a stop valve 44 and a reducing valve 45. In lieu of the use of the cylinder of $CO_2$, a container of tetraethyl lead may be employed in which event elements 44 and 45 are replaced by suitable valve and pump means.

Referring to Fig. 6, there will now be described a modification adapted particularly for the introduction of tetraethyl lead, the form shown in Fig. 6 also being identical to that shown in Fig. 4 with the exception of certain elements to be set forth hereinafter. A container 46 is shown in Fig. 6 having $CO_2$ gas in the upper portions thereof and tetraethyl lead in the lower portions thereof, the $CO_2$ being under pressure and acting to force the tetraethyl lead into the system via a stop valve 47 and a reducing valve 48 analogous respectively to the elements 44, 45 aforementioned. A detonation pickup device 41 is employed to actuate the solenoid valve 40 as before. This is considered an advantageous embodiment since only relatively small amounts of tetraethyl lead will be employed, and only small amounts of it are required for improving the anti-knock characteristics of almost any fuel employed normally in engines of this type.

The embodiments of Figs. 5 and 6 reduce greatly the size of the anti-detonant container.

The container 46 (Fig. 6) for the tetraethyl lead must be constructed to provide adequate safety for the user and preferably should include suitable means for preventing the opening of the container by the user under conditions wherein the fumes from or the liquid tetraethyl lead are released. Thus the container 46 may comprise a metal bottle having a pierceable cap 46a, for example, of rubber or rubber-like material which can be pierced by a pointed extremity 46b of a pipe 46c which leads to the stop valve 47. It is, of course, understood that suitable means (not shown) are provided for mounting the container 46 in the position shown.

Referring now to Fig. 7, a further form of the invention is shown employing a system of circuits in combination with a detonation pickup, the function of which circuits is to correct the output of such pickup (which may be of magnetostrictive type) to one which is proportional to the average knock amplitude. The system of Fig. 7 controls a suitable control valve which permits anti-knock additive to be blended with the base fuel in proportion to such average knock amplitude. Such control of the main control valve is accomplished by means of a closed loop servo system constructed and arranged such that the amount of the main control valve opening (and hence the amount of anti-knock substance added to the base fuel) is directly proportional to the aforementioned average knock intensity.

A detonation pickup device 49 (Fig. 7) is employed which may be similar to those mentioned above and which is suitably connected operatively to a combustion chamber of internal combustion engine 50 whereby it is actuated, for example, by magnetostrictive effect. The pickup device 49 in turn is operatively connected to a tuned amplifier 51 which in turn is connected to a threshold circuit device 52, the latter in turn being connected to a pulse amplifier 53. The latter functions so as to produce short time exponential pulses, the amplitudes of which are proportional to peak detonation intensity. The pulses from the pulse amplifier 53 are introduced into two channels 54 and 55. The first of these two channels, 54, includes a multivibrator circuit 56 which emits a pulse of approximately rectangular shape for each exponential pulse received by it. These rectangular pulses, however, are independent (in amplitude and duration) of the height of the detonation pulse received from the pulse amplifier 53. The multivibrator circuit 56 in turn is connected to an integrator circuit 57. In view of the conformation of the pulses received by the integrator circuit 57 from the multivibrator 56, the voltage output of the integrator which accumulates the rectangular pulses, is proportional to the average number of pulses per second.

The voltage output of the integrator 57 is employed for the purpose of controlling the amplification of a variable gain amplifier 58 to which such integrator is operatively connected. The pulse amplifier 53, as aforementioned, is also operatively connected to the variable gain amplifier 58 via the channel 55.

The control characteristic of the variable gain amplifier 58 is made to be inversely proportional to the voltage output of the multivibrator 56 or the voltage output of the elements in the multivibrator channel, namely, 56 and 57.

The variable gain amplifier 58 directs its energy to an integrator 59 in which the output of the amplifier 58 is integrated to obtain an output which is proportional to the average knock intensity.

By means of a servo adding network or suitable servo adding means 60, the output of the integrator 59 is algebraically added to the output of a potentiometer 61. The latter is under the influence of a control valve 62 which is driven by a servo motor 63. The latter in turn is under the influence of an amplifier 64 which is in turn controlled by the aforementioned servo adding network 60.

Thus the outputs of the integrator 59 and the potentiometer 61 control the servo adding network 60 which is amplified by the amplifier 64 to govern the servo motor 63 which in turn controls the additive control valve 62. As aforementioned the output of the potentiometer 61 is proportional to the valve opening of the additive control valve 62. In operation, the output of the servo adding network 60 amplified by the amplifier 64 in turn operates the motor 63 proportionally to control the opening of the valve 62 for the additive substance.

The control valve 62 receives the additive substance from an anti-detonant container 65 via a pump 66, the control valve 62 directing same to a blend chamber element 67 in which the anti-detonant is blended with the base fuel from a main fuel tank 68 which is directed to such chamber element 67 via a pump 69. The blended base fuel and anti-detonant additive are directed to the engine 50 via the channel or passage means 70.

The aforementioned elements comprising the servo adding network 60, the amplifier 64, the potentiometer 61 and the motor 63 form a closed loop servo system, the output of which is proportional to detonation intensity and hence the valve opening of the control valve 62 is similarly proportional.

Note that detonation pickup means can be connected to one or a plurality of the combustion chambers of an engine so that the anti-detonant can be directed (from valves 17, or 20 or 40 or 62) to corresponding combustion chambers.

There is thus provided a novel system for detecting an undesired detonation within an internal combustion engine, which detonation exceeds a predetermined limit, the system having anti-detonant control valve means for governing the amount of anti-detonant to be blended with the base fuel. Alternatively, such anti-detonant control valve controls the amount of anti-detonant which can be injected directly into the engine without such prior blending. In either case the amount of anti-detonant so employed is in proportion to the contemporaneous demand thereof. In the carburetor type of internal combustion engine the anti-detonant can be mixed with the base fuel at or in the carburetor or an auxiliary nozzle for the anti-detonant can be provided in the intake manifold of the engine through which the anti-detonant is injected. Also alternatively, the anti-detonant can be mixed with the base fuel in the fuel line just ahead of each fuel inlet valve of the engine manifold. With respect to the "fuel injection" type of fuel system as opposed to the carburetor type, the anti-detonant can be mixed with the base fuel at a location just ahead of each fuel inlet valve in the engine manifold or it can be injected into the fuel loop. Alternatively, the anti-detonant can be injected directly into the combustion chamber to be mixed with the base fuel just before combustion. The detonation pickup means, such as the one above mentioned of magnetostrictive type, can comprise one detonation device for one engine, it being operatively connected to a selected cylinder such as the cylinder (or combustion chamber) which from experience is known to knock first or the cylinder most representative of engine conditions. In lieu of the latter, more than one of such detonation devices can be employed, namely, one for each cylinder or one for a selected number of cylinders, the minimum, of course, being one device, the remainder of the apparatus governing the introduction of the anti-detonant to corresponding combustion chambers. The aforementioned knock or detonation sensing device is selective in its operation in that it will not be actuated until a preset or predetermined extent of knock is present. The introduction of the anti-detonant is only in amounts needed to produce or suppress the knock to such preset or predetermined level. Furthermore, the extent of introduction of anti-detonant is in proportion to the severity of the knock measured directly at the cylinder or cylinders.

Further, there is thus provided novel apparatus wherein: for any specific engine one needs to pay only for that quantity of premium or high grade fuel as called for during knocking. Also, conventional adjustments in the engine can go on as before. However, if for any reason the normal engine adjustments, such as timing and fuel-air mixture, fail to give optimum conditions and knocking occurs, the present invention will respond to the presence of knock and an anti-knock substance will be added to correct the situation.

What is claimed is:

Apparatus for automatically suppressing detonation in an internal combustion engine, including in combination: an engine of the aforementioned type; a base fuel tank, an anti-detonant container; a blend chamber element; means including a base fuel pump for moving base fuel from such tank to such chamber element; means including an anti-detonant pump for moving anti-detonant from such container to such chamber element; a control valve for metering the amount of detonant moved from such container to such chamber element; a detonation sensing device positioned for measuring the extent of detonation within a combustion chamber of such engine; means for correcting the output of such sensing device to one which is proportional to average knock amplitude; such last-named means including a closed loop servo system for controlling the opening of said control valve to be directly proportional to such average knock amplitude, such correcting means and system comprising: a tuned amplifier connected to said detonation sensing device for receiving its output, a threshold circuit device operatively connected to such amplifier and constructed and arranged for eliminating from the output of said amplifier all signals except those in excess of a preselected threshold amplitude, a pulse amplifier connected to said threshold circuit for receiving the output of the latter, said pulse amplifier being constructed to produce pulses, the amplitudes of which are proportional to peak detonation intensity, a multivibrator circuit, a variable gain amplifier, said pulse amplifier being connected to both said multivibrator circuit and said variable gain amplifier to direct its output thereto, said multivibrator circuit being constructed to emit pulses independent in amplitude and duration of the height of the detonation pulse received from said pulse amplifier, a first integrator for integrating the output of said multivibrator circuit to produce an output proportional to the average number of pulses per second received from said multivibrator and directing same to said variable gain amplifier for controlling the amplification thereof, a second integrator for receiving the output of said variable gain amplifier, integrating same and producing an output which is proportional to the average knock or detonation amplitude, a potentiometer, a servo motor operatively connected to said control valve and also to said potentiometer for controlling same, means for adding algebraically the output of said second integrator and said potentiometer including a servo adding network, and means including an amplifier for controlling said servo motor by means of the output of said servo adding network.

References Cited in the file of this patent

UNITED STATES PATENTS

| | | |
|---|---|---|
| 2,220,558 | Van Dijck et al. | Nov. 5, 1940 |
| 2,450,882 | Costa | Oct. 12, 1948 |
| 2,482,531 | Young et al. | Sept. 20, 1949 |